United States Patent Office 2,992,223
Patented July 11, 1961

1

2,992,223
N β-CYANOVINYL SUCCINIMIDE
Everett J. Frazza, Amawalk Acres, Yorktown Heights, N.Y., and Lorence Rapoport, Stamford, Conn., assignors to American Cyanamid Company, New York, N.Y., a corporation of Maine
No Drawing. Filed Dec. 24, 1957, Ser. No. 704,879
2 Claims. (Cl. 260—281)

This invention relates to a new class of compounds. More particularly, it relates to β-cyanovinylimides and the preparation thereof.

The new class of β-cyanovinylimides are prepared according to the process of this invention by the cyanovinylation of imides. More particularly, the products of this invention are obtained by reacting β-chloroacrylonitrile with an imide in an inert reaction medium preferably in the presence of a hydrogen chloride acceptor. On completion of the reaction, which is conducted at below about 125° F., the precipitate is separated by conventional means and the β-cyanovinylimide recovered from the residual liquor as by distillation or crystallization.

The particular reaction medium employed in the process of this invention is restricted only in that it be inert to the reactants and is preferably a solvent therefor. Any of the conventional materials, including water, which are generally employed in this capacity are suitable. Alcohols such as methanol; chlorinated aliphatic hydrocarbons such as carbon tetrachloride and trichlorethylene; benzene and its homologues and their halogenated derivatives; amides such as dimethylformamide; esters such as ethyl acetate; ketones such as acetone and the like may all be used. During the reaction, it is also preferable to have present an acceptor to fix the hydrogen chloride. Illustrative of the various materials which may be employed for this purpose are inorganic bases such as sodium carbonate and bicarbonate; tertiary amines such as triethylamine, N-ethylmorpholine, dimethylbenzylamine, tributylamine, pyridine, N-methylpyridine and the like.

The compounds of the present invention may also be prepared by reacting β-chloroacrylonitrile with a salt of an imide such as an alkali metal salt preferably sodium or potassium. When prepared in this manner, the alkali metal combines with the chlorine and the addition of a tertiary amine as an HCl acceptor is unnecessary.

The compounds of this invention have various uses. Among these may be mentioned their use in the field of agriculture wherein herbicidal properties have been demonstrated. The unsaturation of these compounds, moreover, renders them useful in the preparation of a variety of copolymers for use in recognized fields.

The following examples will illustrate the invention. All parts are by weight unless otherwise indicated.

EXAMPLE 1

N β-cyanovinyl succinimide

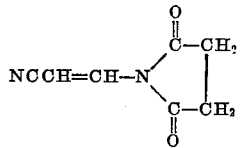

A mixture of 19.8 parts of succinimide, 17.5 parts of β-chloroacrylonitrile, 20.2 parts of triethylamine, and 220 parts of acetone is heated under reflux for 20 hours. The suspension is cooled and filtered and the filtrate evaporated to a semisolid residue. The residue is washed by stirring with 150 parts of water and then dissolved in 150 parts of boiling absolute alcohol. On cooling, 6.0 parts of dark needle-like crystals precipitate. Recrystallization from 200 parts of alcohol with Darco gives 5.5 parts (18%) of white crystalline product melting at 154–156° C. Calc'd. for $C_7H_6N_2O_2$: C, 55.99; H, 4.03; N, 18.66. Found: C, 55.93; H, 4.16; N, 18.48.

EXAMPLE 2

N β-cyanovinyl glutarimide

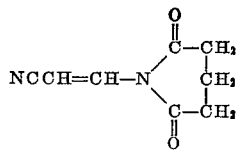

The procedure of Example 1 is repeated replacing succinimide with glutarimide to give N β-cyanovinyl glutarimide.

EXAMPLE 3

N β-cyanovinyl phthalimide

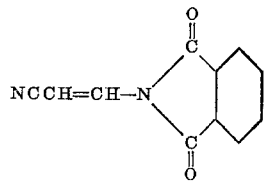

To a solution of 14.7 parts of phthalimide, 10.1 parts of trimethylamine and 100 parts of dimethylformamide is added 8.8 parts of β-chloroacrylonitrile. After standing for one hour at room temperature, the mixture is heated slowly to 50° C. and held there for 6 hours and then cooled. Dilution with 150 parts of water followed by filtration gives 9.8 parts of N β-cyanovinyl phthalimide.

We claim:
1. A method of preparing an N β-cyanovinylimide of a dicarboxylic acid which comprises reacting β-chloroacrylonitrile with a compound selected from the group consisting of dicarboxylic acid imides and the alkali metal salts thereof in an inert reaction medium at a temperature below about 125° F. and recovering resultant N β-cyanovinylimide.

2. A method of preparing an N β-cyanovinylimide which comprises reacting β-chloroacrylonitrile with a compound selected from the group consisting of succinimide, glutarimide and phthalimide and the alkali metal salts thereof in an inert reaction medium at a temperature below about 125° F. and recovering the resultant N β-cyanovinylimide.

References Cited in the file of this patent

UNITED STATES PATENTS

| | | |
|---|---|---|
| 2,231,905 | Hanford | Feb. 18, 1941 |
| 2,412,817 | Lacey et al. | Dec. 17, 1946 |
| 2,490,756 | Kenyon et al. | Dec. 6, 1949 |

OTHER REFERENCES

Polonovski et al.: Compt. Rend., vol. 241, pages 215–217 (1955).